United States Patent
Civerolo et al.

(10) Patent No.: US 10,921,423 B2
(45) Date of Patent: Feb. 16, 2021

(54) MULTICARRIER AND FREQUENCY HOPPED RADAR WAVEFORM GENERATOR USING EFFICIENT DIGITAL SYNTHESIS

(71) Applicant: SPAWAR Systems Center Pacific, Code 36000, San Diego, CA (US)

(72) Inventors: Michael P. Civerolo, San Diego, CA (US); Nicholas T. Johnson, San Diego, CA (US); Nicholas A. Lumsden, Escondido, CA (US); Colin J. O'Brien, San Diego, CA (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 302 days.

(21) Appl. No.: 16/045,354

(22) Filed: Jul. 25, 2018

(65) Prior Publication Data
US 2020/0033441 A1    Jan. 30, 2020

(51) Int. Cl.
*G01S 7/282*    (2006.01)

(52) U.S. Cl.
CPC ................... *G01S 7/282* (2013.01)

(58) Field of Classification Search
CPC ........................................................ G01S 7/282
See application file for complete search history.

(56) References Cited

U.S. PATENT DOCUMENTS

| 5,861,834 A | 1/1999 | Sauer et al. |
| 7,656,341 B2 | 2/2010 | Reeves |

(Continued)

FOREIGN PATENT DOCUMENTS

| EP | 1050759 A2 | 1/2006 |
| WO | WO1995006376 A1 | 3/1995 |

OTHER PUBLICATIONS

F. J. Harris, "Multirate Signal Processing for Communication Systems", Prentice-Hall, pp. 106-126, 2004.
(Continued)

*Primary Examiner* — Erin F Heard
*Assistant Examiner* — Donald H B Braswell
(74) *Attorney, Agent, or Firm* — Naval Information Warfare Center, Pacific; Kyle Eppele

(57) ABSTRACT

A radar pulse generator includes a multiplexer, a polyphase synthesizer, a first signal channel and a second signal channel. The multiplexer has a baseband radar pulse input, a multiplexer control input, a first channel output and a second channel output. The baseband radar pulse input signal is a single channel baseband radar pulse signal. The multiplexer control input signal selects one of the group consisting of the first channel output and the second channel output. The polyphase synthesizer synthesizes the first channel output signal, synthesizes the second channel output signal and outputs a desired radar pulse signal based on the synthesized first channel output signal and the synthesized second channel output signal. The first signal channel provides the first channel output signal from the first channel output to the polyphase synthesizer. The second signal channel provides the second channel output signal from the second channel output to the polyphase synthesizer.

8 Claims, 10 Drawing Sheets

(56) References Cited

U.S. PATENT DOCUMENTS

| | | | | |
|---|---|---|---|---|
| 2014/0370917 A1* | 12/2014 | Buchheim | ............ | H04W 4/023 455/456.1 |
| 2016/0154091 A1* | 6/2016 | Yosoku | ................. | G01S 7/023 342/201 |
| 2018/0052219 A1* | 2/2018 | Ahmed | ................. | A61K 39/12 |

OTHER PUBLICATIONS

Proakis, J. et al., "Digital Signal Processing Principles, Algorithms, and Applications 4th Ed," Prentice-Hall, pp. 74, 454-457, 2007.

* cited by examiner

MULTICARRIER AND FREQUENCY HOPPED RADAR WAVEFORM GENERATOR USING EFFICIENT DIGITAL SYNTHESIS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103683.

BACKGROUND OF THE INVENTION

Embodiments of the invention relate to frequency hopping radar systems.

Multicarrier and frequency-hopped radars are radar types which either change the carrier frequency of their radar pulse or use multiple simultaneous carriers either to be jam resistant or to get more information about a radar target by illuminating the target at different frequencies. Prior art multicarrier and frequency-hopped radars employ techniques that can be non-linear, cause calibration issues, are inefficient, or are slow to modify.

There exists a need for a radar pulse generator that can quickly and efficiently modify its carrier frequencies.

SUMMARY OF THE INVENTION

Aspects of the present disclosure provide a radar pulse generator that can quickly and efficiently modify its carrier frequencies.

An aspect of the present disclosure is drawn to a radar pulse generator including a multiplexer, a polyphase synthesizer, a first signal channel and a second signal channel. The multiplexer has a baseband radar pulse input, a multiplexer control input, a first channel output and a second channel output. The baseband radar pulse input is operable to receive a baseband radar pulse input signal. The multiplexer control input is operable to receive a multiplexer control input signal. The first channel output is operable to output a first channel output signal. The second channel output is operable to output a second channel output signal. The baseband radar pulse input signal is a single channel baseband radar pulse signal. The multiplexer control input signal is operable to select one of the group consisting of the first channel output and the second channel output. The polyphase synthesizer is operable to synthesize the first channel output signal, to synthesize the second channel output signal and to output a desired radar pulse signal based on the synthesized first channel output signal and the synthesized second channel output signal. The first signal channel is operable to provide the first channel output signal from the first channel output to the polyphase synthesizer. The second signal channel is operable to provide the second channel output signal from the second channel output to the polyphase synthesizer.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

Aspects of the present disclosure provide a radar pulse generator that is computationally efficient, creates a clean power-efficient spectrum, and allows real-time modification of the output spectrum.

Radars are used in both military and commercial applications to determine if there are objects within range of the radar and also determine the size, location, velocity, and other physical characteristics of those objects. Radars generate a pulse and transmit that pulse on a carrier frequency in the radar's designated frequency band. There are several advantages to being able to change the carrier frequency of the radar pulse or use multiple carrier frequencies within the designated band. One advantage is resistance to jamming or interference that exists at discrete frequencies within the designated band. Another advantage is to gather more information about the radar targets by illuminating the targets with different carrier frequencies, as most targets have a frequency-dependent radar response.

Prior art methods of generating multicarrier or frequency-hopped radar pulses suffer from several disadvantages: some methods are computationally expensive and slow to change carrier frequency, while other methods exhibit poor out-of-band performance and are difficult to calibrate. There exists a need for generating radar pulses that is computationally efficient, creates a clean power-efficient spectrum, and is dynamically tunable.

Aspects of the present disclosure will now be further described with reference to FIGS. 1A-7E.

Figure 1A:
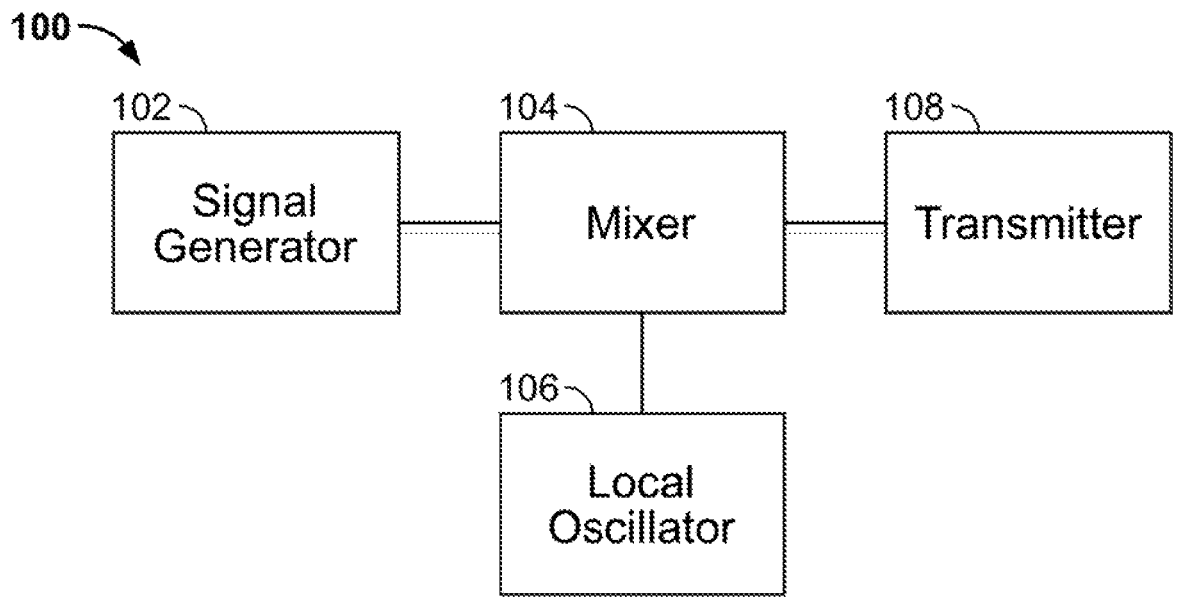
FIGS. 1A-B illustrate prior art radio frequency (RF) hoppers.
Figure 1B:
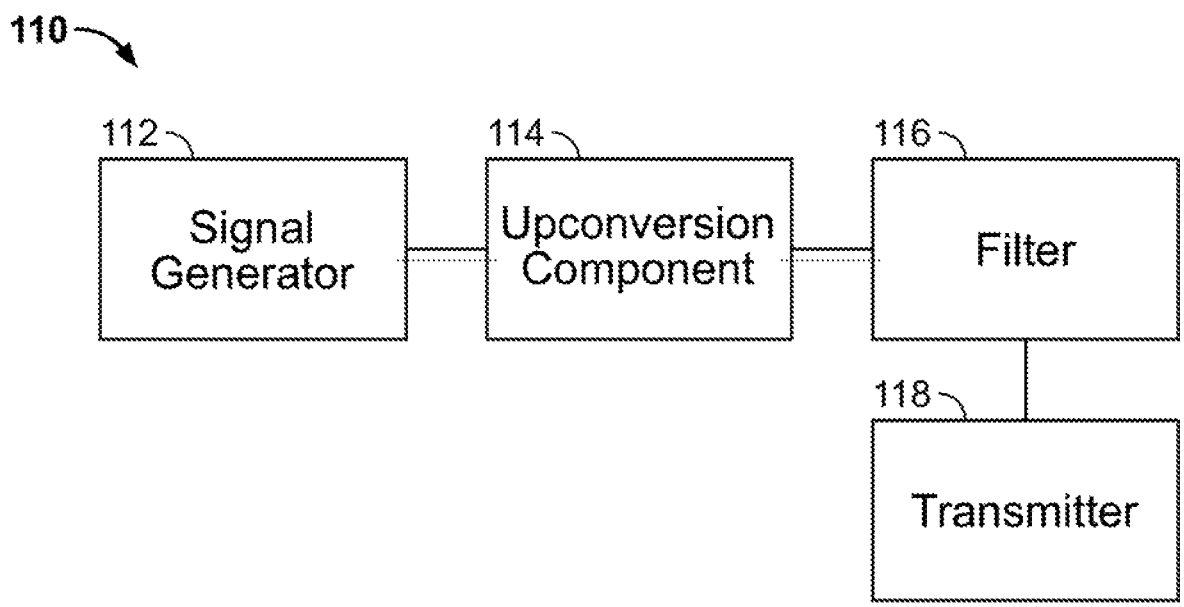

FIGS. 1A-B illustrate prior art RF hoppers 100 and 110.

FIG. 1A illustrates RF hopper 100 that uses an analog method to change an RF signal's carrier frequency.

As shown in the figure, RF hopper 100 contains a baseband signal generator 102, a mixer 104, a local oscillator 106, and a transmitter 108.

Baseband signal generator 102 generates a radar pulse at baseband or a low intermediate frequency. Local oscillator 106 generates a signal at a desired carrier frequency. Mixer 104 multiplies the baseband radar pulse and the carrier signal and results in an RF signal at the desired carrier frequency. Transmitter 108 amplifies the RF signal.

In operation, the carrier frequency of local oscillator 106 is varied in order to frequency-hop the transmitted signal. Because of the analog method and components that are used, RF hopper 100 often exhibits poor out-of-band performance and calibration issues.

FIG. 1B illustrates RF hopper 110 that uses a digital frequency-conversion technique.

As shown in the figure, RF hopper 110 contains a baseband signal generator 112, an upconversion component 114, a filter 116, and a transmitter 118. Baseband signal generator 112 generates a baseband radar pulse in the digital domain. Upconversion component 114 converts a low-sample-rate input signal to a high-sample-rate output signal. Filter 116 attenuates undesired out-of-band signals. Transmitter 118 converts a digital input signal into an amplified analog RF output signal.

In operation, frequency hopping in RF hopper 110 is achieved by changing parameters in baseband signal generator 112, upconversion component 114, and filter 116. This often requires a large amount of processing power and cannot be achieved quickly.

FIGS. 1A-B illustrate prior art RF hoppers. Aspects of a radar pulse generator using a polyphase synthesizer will now be discussed with reference to FIGS. 2-4.

Figure 2:
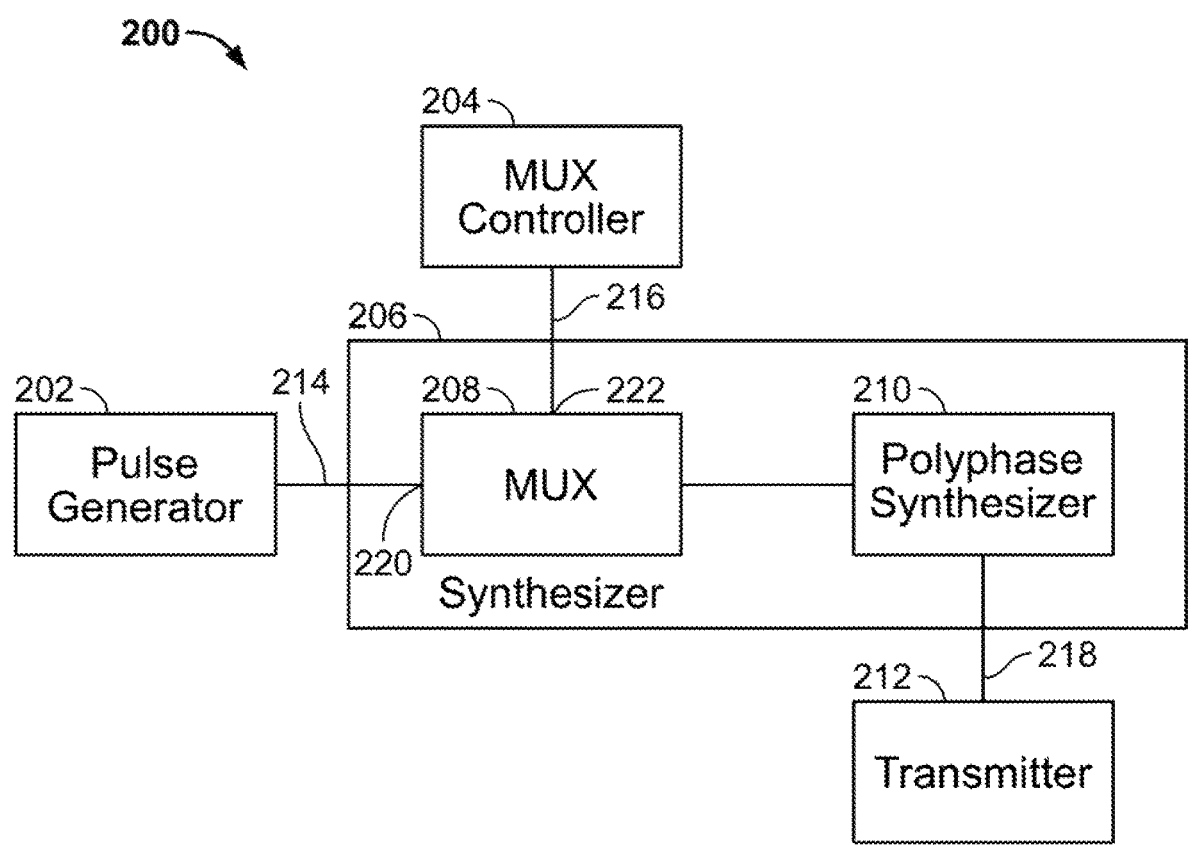
FIG. 2 illustrates a radar pulse generator in accordance with aspects of the present disclosure.

FIG. 2 illustrates radar pulse generator 200 in accordance with aspects of the present disclosure.

As shown in the figure, radar pulse generator 200 contains a baseband radar pulse generator 202, a multiplexer controller 204, a synthesizer block 206, and a transmitter 212.

In this example, baseband radar pulse generator 202, multiplexer controller 204, synthesizer block 206, and transmitter 212 are illustrated as individual devices. However, in some embodiments, at least two of baseband radar pulse generator 202, multiplexer controller 204, synthesizer block 206, and transmitter 212 may be combined as a unitary device.

Further, in some embodiments, at least one of baseband radar pulse generator 202, multiplexer controller 204, synthesizer block 206, and transmitter 212 may be implemented as non-transitory, tangible, computer-readable media having computer-readable instructions stored thereon, the computer-readable instructions being capable of being read by a computer and being capable of instructing the computer to perform a method of generating a radar pulse signal. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Synthesizer block 206 contains a multiplexer 208 and a polyphase synthesizer 210.

Multiplexer 208 includes a baseband radar pulse input 220 and a multiplexer control input 222.

Synthesizer block 206 accepts a baseband radar pulse signal 214 from baseband radar pulse generator 202 and a multiplexer control input signal 216 from multiplexer controller 204. More specifically, baseband radar pulse input 220 is operable to receive baseband radar pulse signal 214 and multiplexer control input 222 is operable to receive multiplexer control input signal 216. Synthesizer block 206 generates a desired radar pulse signal 218.

Baseband radar pulse generator 202 is any device or method that generates a radar pulse signal within a narrow frequency band.

Multiplexer controller 204 is any device or method that creates multiplexer control input signal 216. In this non-limiting example, multiplexer control input signal 216 describes the carrier frequency of desired radar pulse signal 218.

Transmitter 212 is any device or method that converts desired radar pulse signal 218 into an analog RF signal.

Aspects of synthesizer block 206 will now be discussed with reference to FIG. 3.

Figure 3:
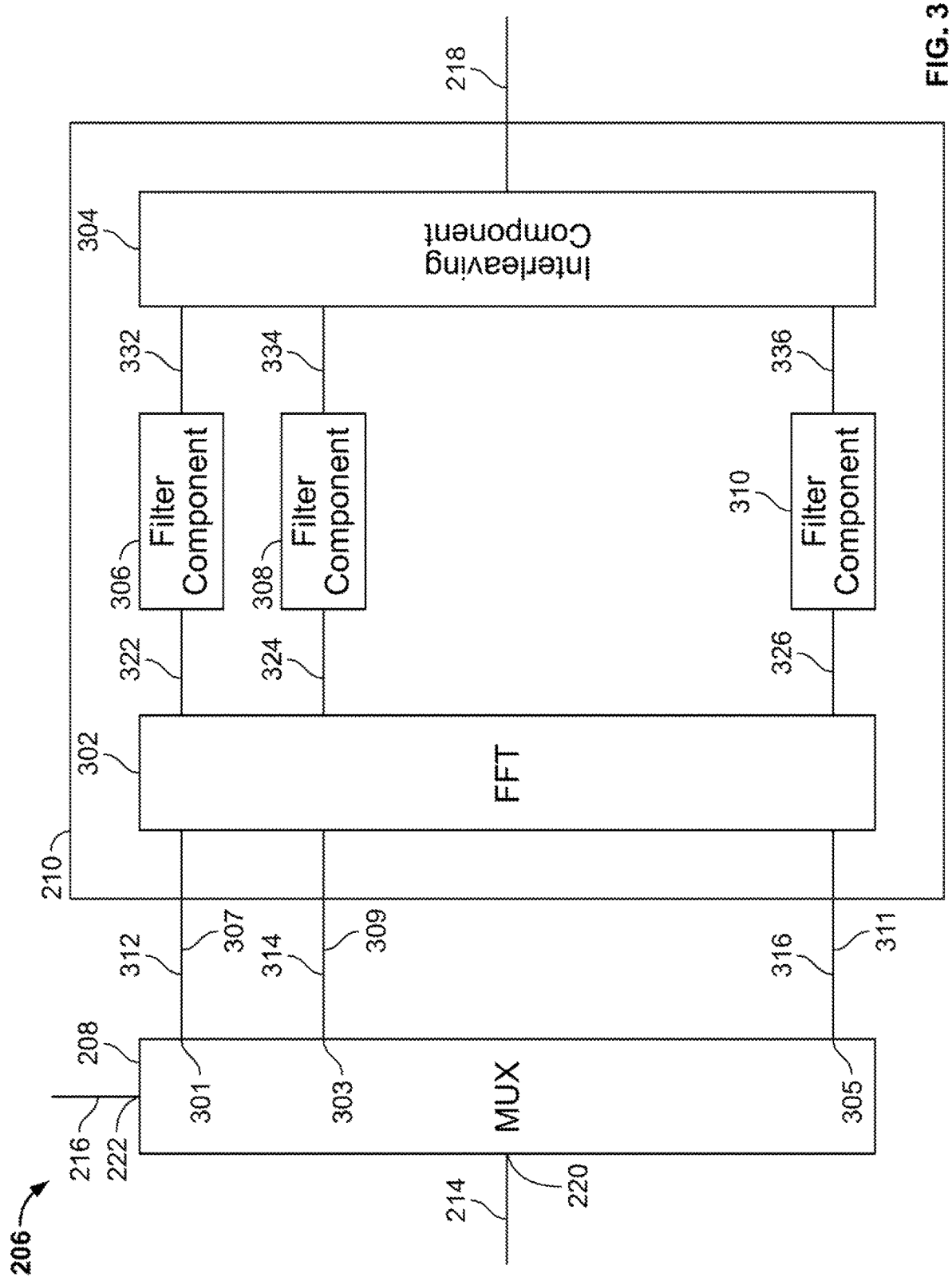
FIG. 3 illustrates a synthesizer block in accordance with aspects of the present disclosure.

FIG. 3 illustrates synthesizer block 206 in accordance with aspects of the present disclosure.

As shown in the figure, synthesizer block 206 contains multiplexer 208, polyphase synthesizer 210, a first signal channel 307, a second signal channel 309 and an $N^{th}$ signal channel 311

Multiplexer 208 includes a first channel output 301 that is operable to output a first channel output signal 312, a second channel output 303 that is operable to output a second channel output signal 314 and an $N^{th}$ channel output 305 that is operable to output an $N^{th}$ channel output signal 316.

First signal channel 307 is operable to provide first channel output signal 312 to polyphase synthesizer 210. Second signal channel 309 is operable to provide second channel output signal 314 to polyphase synthesizer 210. $N^{th}$ signal channel 311 is operable to provide $N^{th}$ channel output signal 316 to polyphase synthesizer 210.

Polyphase synthesizer 210 is operable to synthesize a first channel output signal, a second channel output signal and an $N^{th}$ channel output signal and to output a desired noise signal based on the synthesized signals. Polyphase synthesizer 210 contains an FFT component 302, an interleaver 304, a first polyphase filter 306, a second polyphase filter 308, and an $N^{th}$ polyphase filter 310.

Multiplexer 208 provides first channel output signal 312, second channel output signal 314, and $N^{th}$ channel output signal 316 to FFT component 302. FFT component 302 provides a first transformed signal 322 to first polyphase filter 306, which then provides a first polyphase filter signal 332 to interleaving component 304. FFT component 302 provides a second transformed signal 324 to second polyphase filter 308, which then provides a second polyphase filter signal 334 to interleaving component 304. FFT component 302 provides an $N^{th}$ transformed signal 326 to $N^{th}$ polyphase filter 310, which then provides an $N^{th}$ polyphase filter signal 336 to interleaving component 304.

Multiplexer 208 is any device or method that maps baseband radar pulse signal 214 into N outputs. Multiplexer 208 uses multiplexer control input signal 216 to enable or disable a combination of first channel output signal 312, second channel output signal 314, or $N^{th}$ channel output signal 316. At a different point in time, multiplexer 208 can use a different value of multiplexer control input signal 216 to enable or disable a different combination of first channel output signal 312, second channel output signal 314, or $N^{th}$ channel output signal 316.

FFT component 302 is any device or method that performs a Fast Fourier Transform on N inputs and results in N outputs.

First polyphase filter 306, second polyphase filter 308, and $N^{th}$ polyphase filter 310 are any device or method that applies a filter to an input signal and results in a transformed output signal.

Interleaving component 304 is any device or method that takes multiple input signals and combines them in time into one output signal. In this non-limiting example, interleaving component 304 takes N input signals, each at a low sampling rate, and combines them into one output signal at N times the input sampling rate.

In operation, radar pulse generator 200 maps baseband radar pulse input signal 214 into any one of N/2 positive frequency bands, each frequency band being of equal bandwidth and having different center frequencies. Baseband radar pulse generator 202 generates baseband radar pulse signal 214. Multiplexer controller 204 generates multiplexer control input signal 216, which selects the desired center frequency onto which baseband radar pulse signal 214 is mapped. Synthesizer block 206 combines N narrowband channels into desired radar pulse signal 218, which is a single wideband signal. Transmitter 212 converts desired radar pulse signal 218 into an analog RF signal.

Synthesizer block 206 can be seen as a high-coefficient single-channel filter which is designed for good passband, transition, and stopband characteristics. The coefficients of this single-channel filter are commutated among the polyphase filters where the nth filter receives the weighting coefficients n, N+n, 2N+n, and so on. In this non-limiting example, first polyphase filter 306 receives weighting coefficients 1, N+1, 2N+1, and so on; second polyphase filter 308 receives weighting coefficients 2, N+2, 2N+2, and so on; and $N^{th}$ polyphase filter 310 receives weighting coefficients N, N+N, 2N+N, and so on.

Desired radar pulse signal 218 has a sampling rate of $f_s$. The structure of radar pulse generator 200 allows each polyphase path to operate at a sampling rate of $f_s/N$; that is, first channel output signal 312, second channel output signal 314, $N^{th}$ channel output signal 316, first transformed signal 322, second transformed signal 324, $N^{th}$ transformed signal 326, first polyphase filter signal 332, second polyphase filter signal 334, and $N^{th}$ polyphase filter signal 336 all operate at a sampling rate of $f_s/N$. Baseband radar pulse signal 214 also has a sampling rate of $f_s/N$.

Polyphase synthesizer 210 requires both positive and negative frequencies; hence for N polyphase paths, there are N/2 possible positive frequency spots.

If the single-channel filter has M coefficients, then first polyphase filter 306, second polyphase filter 308, and Nth polyphase filter 310 each have M/N coefficients.

FIGS. 2-3 illustrate radar pulse generator 200. A process for generating frequency-hopped radar pulses will now be discussed with reference to FIG. 4.

Figure 4:
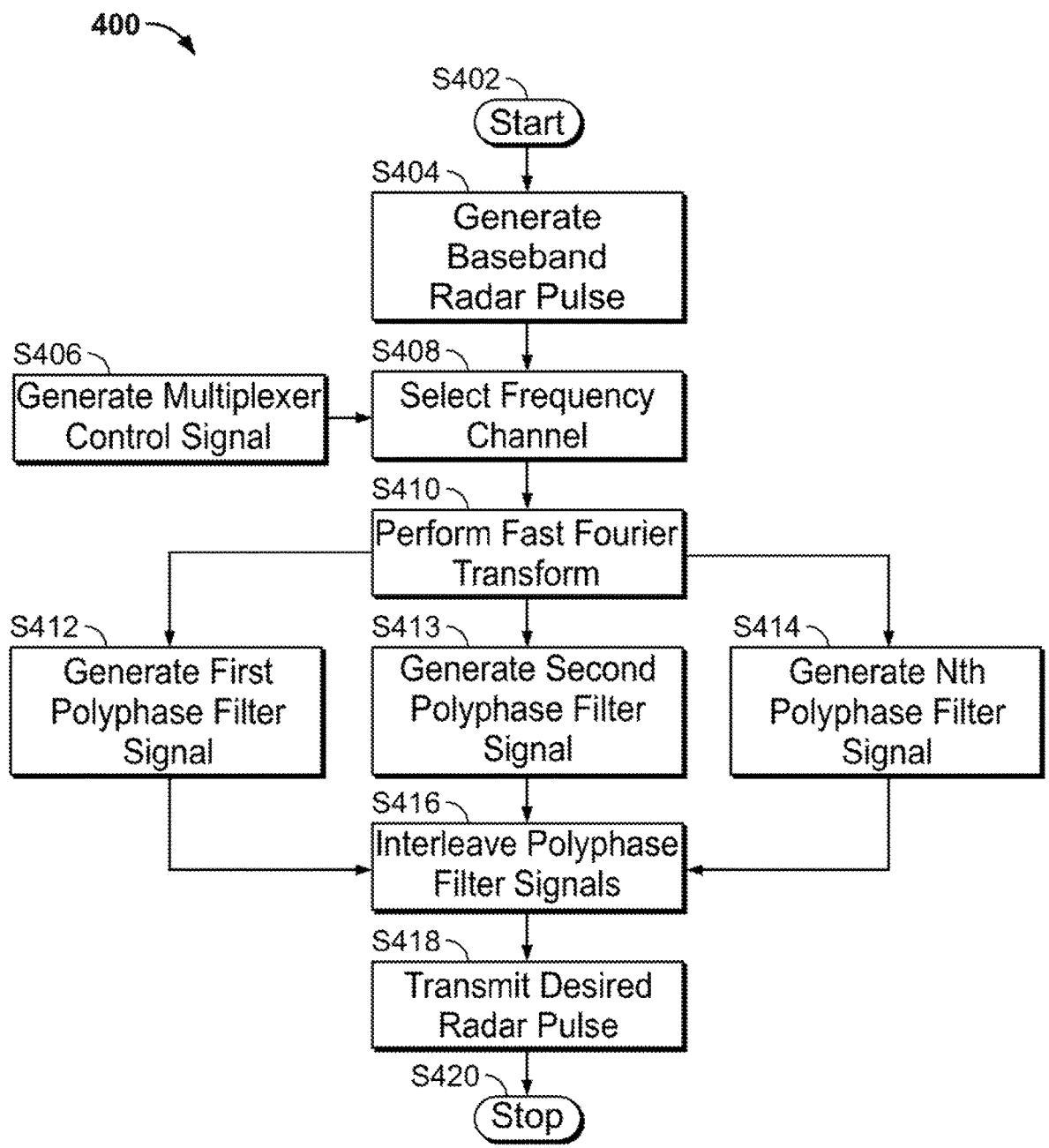
FIG. 4 illustrates a process to generate radar pulses in accordance with aspects of the present disclosure.

FIG. 4 illustrates process 400 to generate radar pulses in accordance with aspects of the present disclosure.

Process 400 starts (S402). Baseband radar pulse generator 202 generates baseband radar pulse signal 214 (S404). Multiplexer controller 204 generates multiplexer control input signal 216 (S406), which selects the desired center frequency onto which baseband radar pulse signal 214 is mapped.

Multiplexer 208 maps baseband radar pulse signal 214 into polyphase channels corresponding to the desired center frequency and outputs all channels to FFT component 302 (S408).

FFT component 302 performs a Fast Fourier Transform (S410). As shown in FIG. 3, FFT component 302 is operable to receive first channel output signal 312, to receive second channel output signal 314, to receive Nth channel output signal 316; to perform a fast Fourier transform on first channel output signal 312, to perform a fast Fourier transform signal on second channel output signal 314, to perform a fast Fourier transform on Nth channel output signal 316, to output first transformed signal 322 based on first channel output signal 312, to output second transformed signal 324 based on second channel output signal 314 and to output Nth transformed signal 326 based on Nth channel output signal 316.

First polyphase filter 306 has a first weighting coefficient and is operable to generate first polyphase filter signal 332 based on first transformed signal 322 and the first weighting coefficient (S412). Second polyphase filter 308 has a second weighting coefficient and is operable to generate second polyphase filter signal 334 based on second transformed signal 324 and the second weighting coefficient (S413). $N^{th}$ polyphase filter 310 has an $N^{th}$ weighting coefficient and is operable to generate $N^{th}$ polyphase filter signal 336 based on $N^{th}$ transformed signal 326 and the $N^{th}$ weighting coefficient (S414).

Interleaving component 304 is operable to output desired radar pulse signal 218 by interleaving first polyphase filter signal 332, second polyphase filter signal 334 and $N^{th}$ polyphase filter signal 336. In other words, interleaving component 304 combines first polyphase filter signal 332, second polyphase filter signal 334, and $N^{th}$ polyphase filter signal 336 and outputs desired radar pulse signal 218 (S416).

Transmitter 212 converts and amplifies desired radar pulse signal 218 into an analog RF signal (S418) and process 400 stops (S420).

FIGS. 2-4 illustrate a system and method for generating radar pulses. Simulation results of an example embodiment of radar pulse generator 200 will now be discussed with reference to FIGS. 5A-7E.

In the example embodiment that is discussed with reference to FIGS. 5A-7E, baseband radar pulse signal 214 is designed to have a bandwidth of 1 MHz, centered around 0 Hz. Its sampling rate, $f_s/N$, is 1 Msps. The chosen number of possible output channels is 100, which corresponds to center frequencies from 0 MHz to 99 MHz in 1 MHz steps. In other words, in an example embodiment, multiplexer 208 is operable to output each channel output signal having a frequency resolution of approximately 1 MHz. N is twice the number of desired center frequencies and is therefore set at 200. Since $f_s/N=1$ Msps and N=200, there are 200 polyphase paths and a 200-point FFT. Desired radar pulse signal 218 is generated with a sampling rate of 200 Msps.

Figure 5A:
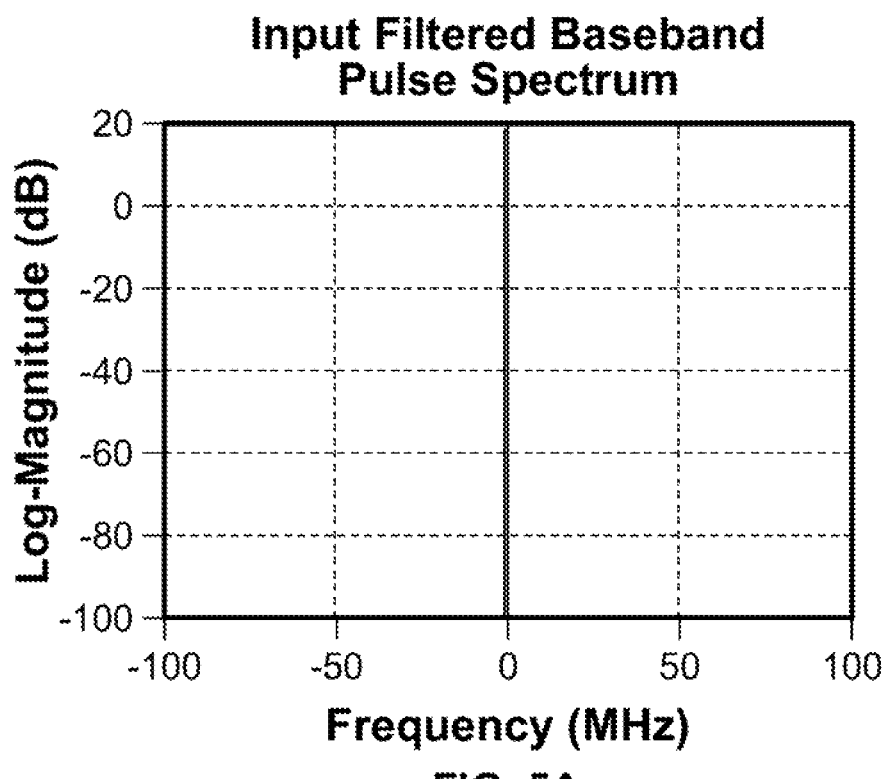
FIGS. 5A-B illustrate a spectrum of an example baseband radar pulse signal in accordance with aspects of the present disclosure.
Figure 5B:
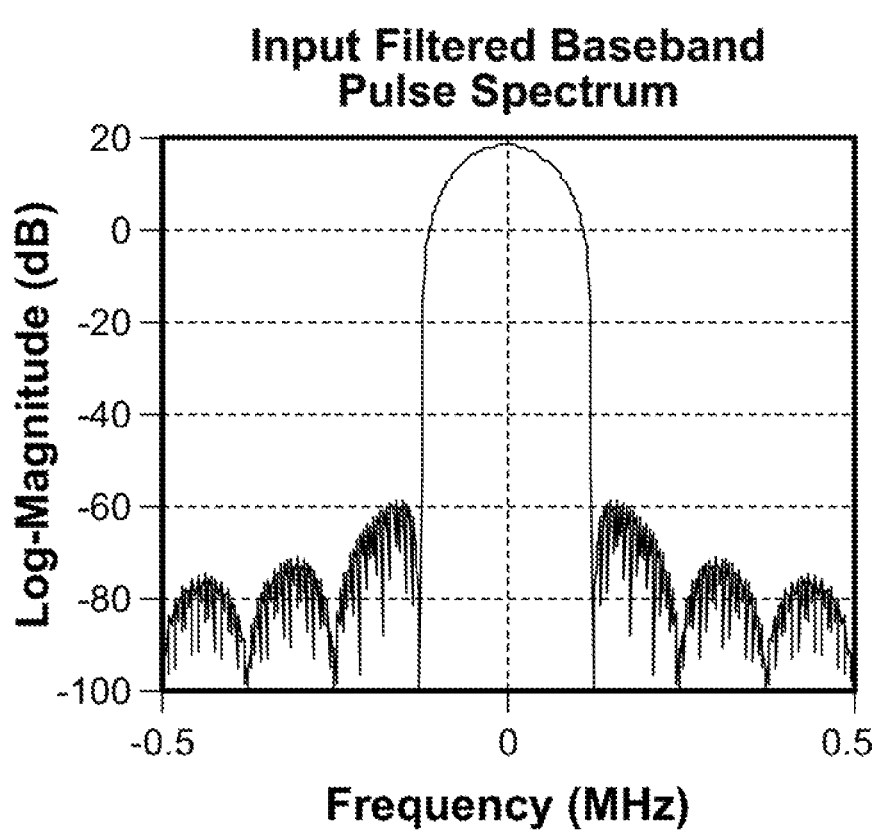

FIGS. 5A-B illustrate a spectrum of an example baseband radar pulse signal 214 in accordance with aspects of the present disclosure.

As shown in FIG. 5A, baseband radar pulse signal 214 occupies a narrow bandwidth compared to the full span of desired radar pulse signal 218. FIG. 5B shows baseband radar pulse signal 214 in greater detail, with transitions clearly at −0.5 and 0.5 MHz. In this non-limiting example, baseband radar pulse signal 214 is sampled at 1 Msps.

FIGS. 5A-B illustrate baseband radar pulse signal 214 that is being fed into synthesizer block 206. Synthesizer block 206 can be seen as a high-coefficient single-channel filter which is designed for good passband, transition, and stopband characteristics. Characteristics of this example embodiment of the single-channel filter will now be discussed with reference to FIGS. 6A-B.

Figure 6A:
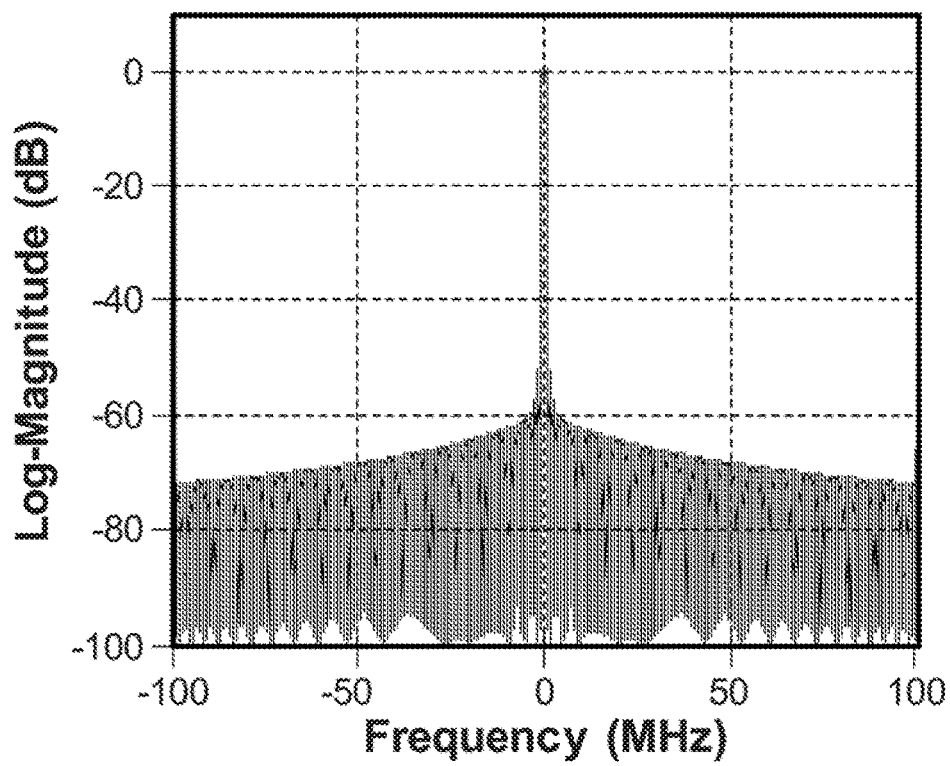
FIGS. 6A-C illustrate a frequency response of an example single-channel filter in accordance with aspects of the present disclosure.
Figure 6B:
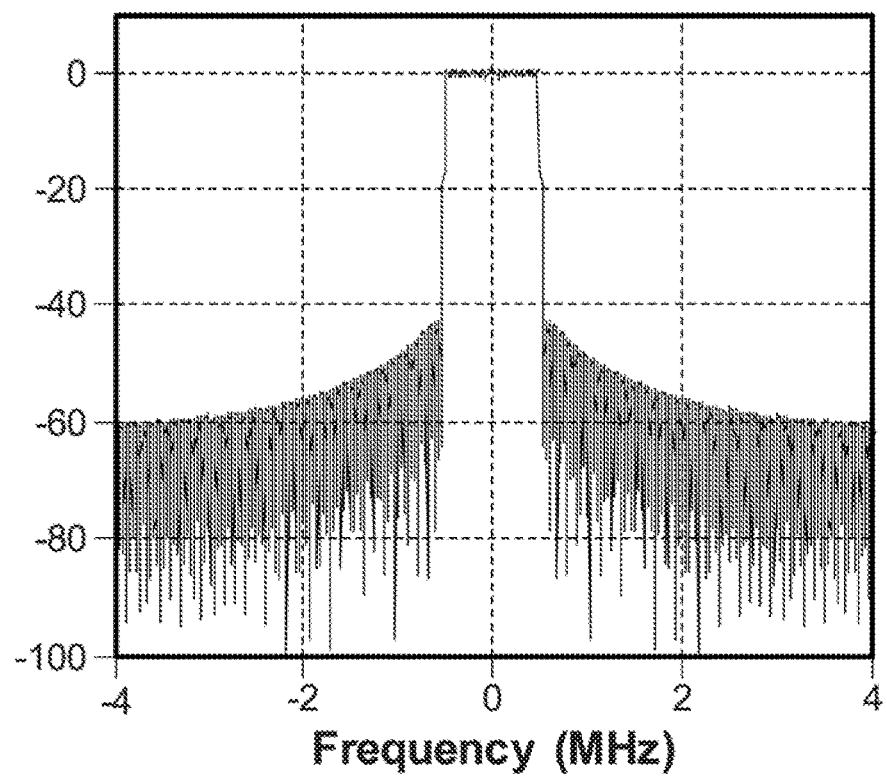

FIGS. 6A-B illustrate the frequency response of the example high-coefficient single-channel filter in accordance with aspects of the present disclosure.

In this example embodiment, the high-coefficient single-channel filter is designed with 8000 coefficients.

FIG. 6A illustrates the narrowness and stopband attenuation of the example high-coefficient single-channel filter.

Figure 6C:
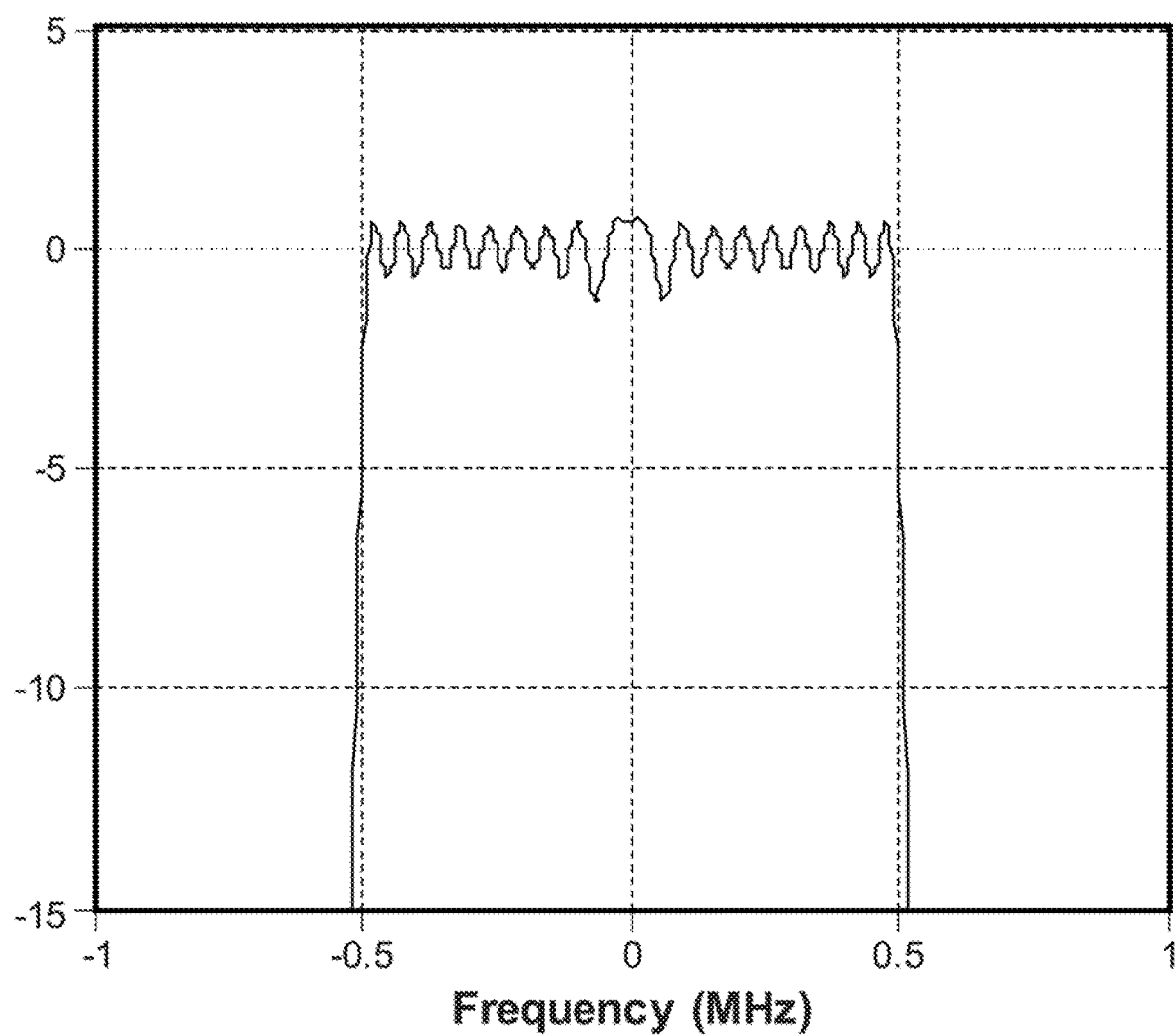

FIG. 6B-C show the frequency response of the high-coefficient single-channel filter in greater detail, illustrating out-of-band rejection of at least 45 dB and low passband ripple of less than 2 dB.

FIGS. 5A-6C illustrate simulations of various components of radar pulse generator 200. Simulations of desired radar pulse signal 218 will now be discussed with reference to FIGS. 7A-E.

FIGS. 7A-E illustrate example output spectra of radar pulse generator 200 in accordance with aspects of the present disclosure.

Figure 7A:
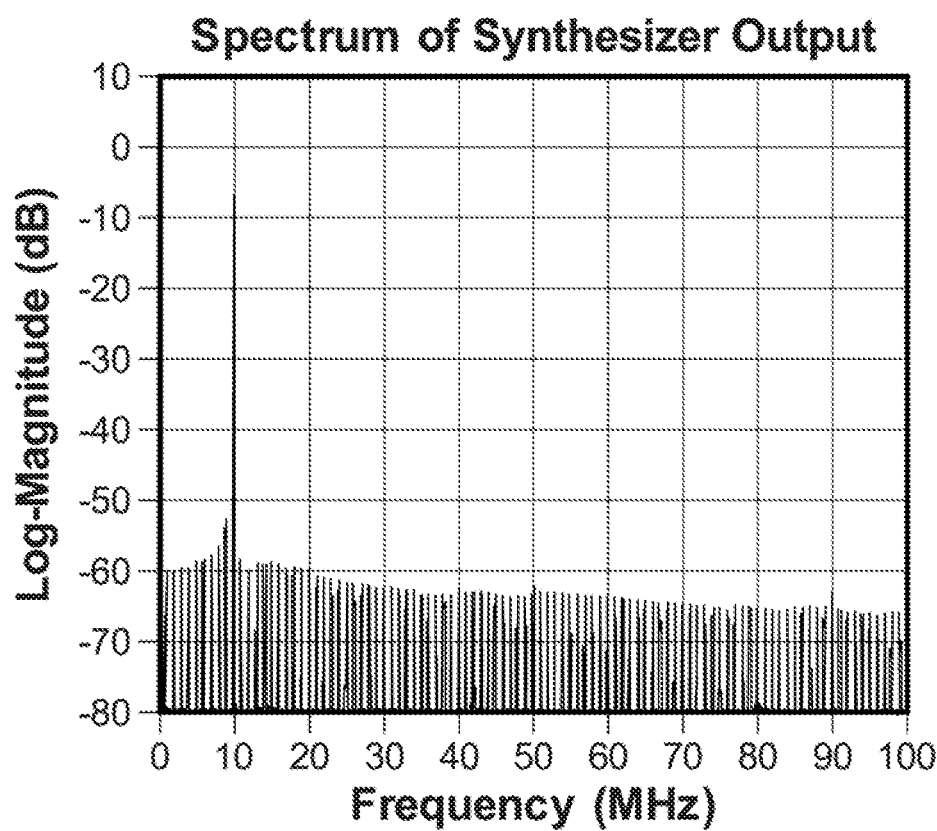
FIGS. 7A-E illustrate example spectra of the radar pulse generator in accordance with aspects of the present disclosure.
Figure 7B:
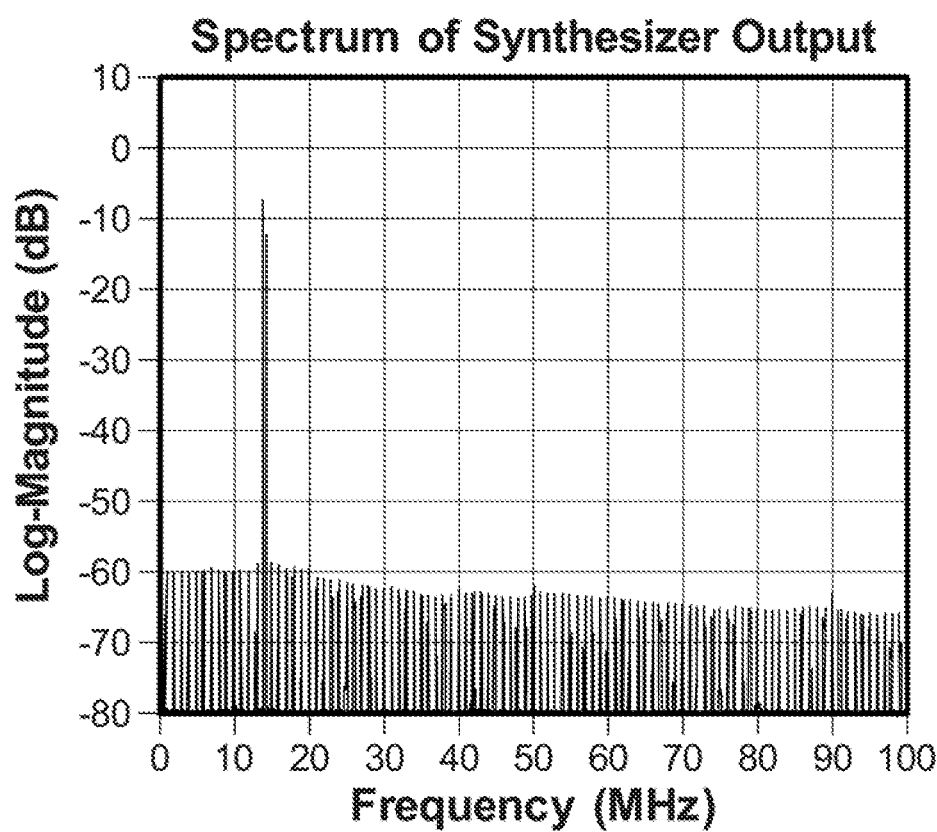

FIGS. 7A-E illustrate how the frequency of desired radar pulse signal 218 can be changed at different times. As shown in FIG. 7A, multiplexer 208 maps baseband radar pulse input signal 214 to a frequency band centered at 11 MHz at a time $t_0$. As shown in FIG. 7B, multiplexer 208 maps at a different time baseband radar pulse input signal 214 to a frequency band centered at 15 MHz at a time $t_1$.

In other words, returning to FIG. 3: desired multiplexer control input 222 of multiplexer 208 is operable to receive a second multiplexer control input signal; first channel output 301 is further operable to output a subsequent first channel output signal; second channel output 303 is further operable to output a subsequent second channel output signal; $N^{th}$ channel output 305 is further operable to output a subsequent $N^{th}$ channel output signal; the second multiplexer control input signal is operable to select one of the group consisting of first channel output 301, second channel output 303, $N^{th}$ channel output 305 and the combination of first channel output 301, second channel output 303 and $N^{th}$ channel output 305.

Further, polyphase synthesizer 210 is further operable: to synthesize the subsequent first channel output signal; to synthesize the subsequent second channel output signal; to synthesize the subsequent $N^{th}$ channel output signal; and to output a subsequent desired radar pulse signal based on the synthesized subsequent first channel output signal, the synthesized subsequent second channel output signal and the subsequent $N^{th}$ channel output signal. More specifically, FFT component 302 is further operable to receive the subsequent first channel output signal, to receive the subsequent second channel output signal, to receive the subsequent $N^{th}$ channel output signal, to perform a fast Fourier transform on the subsequent first channel output signal, to perform a fast Fourier transform on the subsequent second channel output signal, to perform a fast Fourier transform on the subsequent $N^{th}$ channel output signal, to output a subsequent first transformed signal based on the subsequent first channel output signal, to output a subsequent second transformed signal based on the subsequent second channel output signal and to output a subsequent $N^{th}$ transformed signal based on the subsequent $N^{th}$ channel output signal. First polyphase filter 306 is further operable to generate a subsequent first polyphase filter signal based on the subsequent first transformed signal and the first weighting coefficient. Second polyphase filter 308 is further operable to generate a subsequent second polyphase filter signal based on the subsequent second transformed signal and the second weighting coefficient. $N^{th}$ polyphase filter 310 is further operable to generate a subsequent $N^{th}$ polyphase filter signal based on the subsequent $N^{th}$ transformed signal and the $N^{th}$ weighting coefficient. Interleaving component 304 is further operable to output the subsequent desired radar pulse signal by interleaving the subsequent first polyphase filter signal, the subsequent second polyphase filter signal and the subsequent $N^{th}$ polyphase filter signal.

By comparing FIG. 7A with FIG. 7B, it is clear that the desired radar pulse signal from time $t_0$ is different from the subsequent desired noise signal from time $t_1$.

Figure 7C:
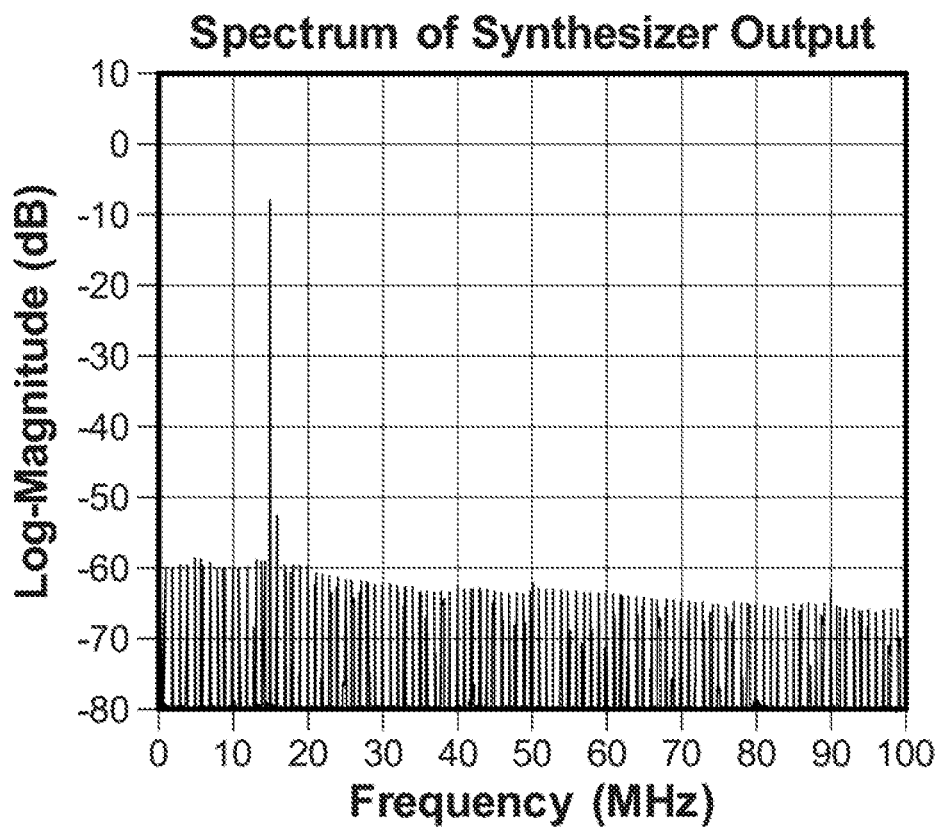
Figure 7D:
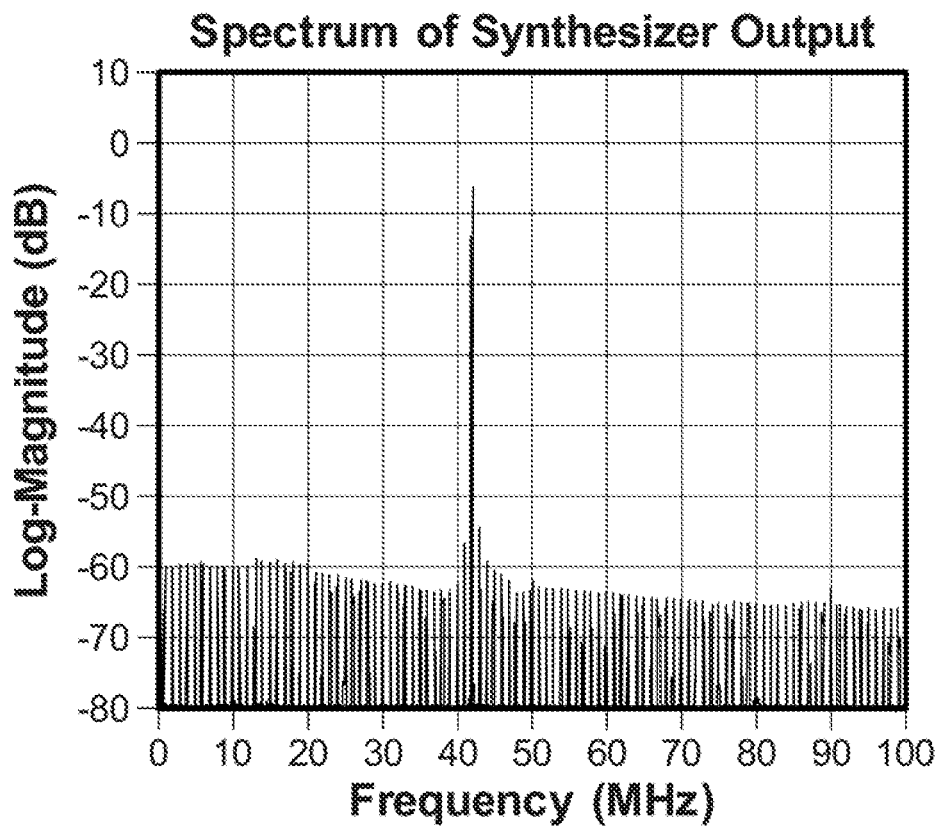
Figure 7E:
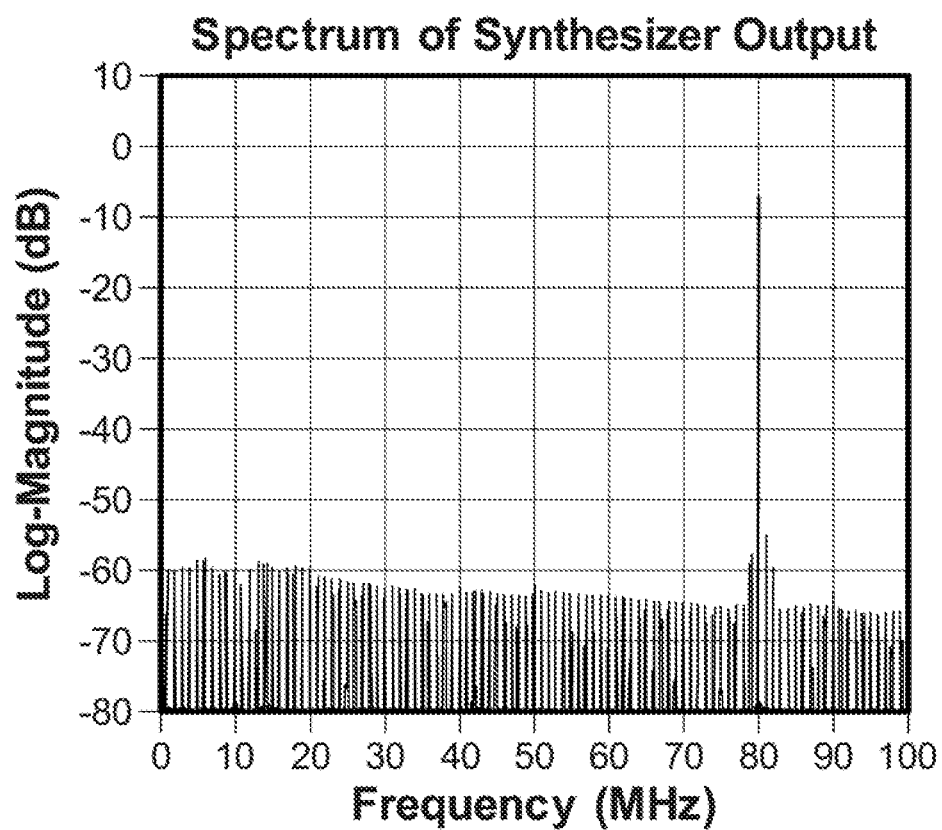

As shown in FIG. 7C, multiplexer 208 maps at yet a time t3 baseband radar pulse input signal 214 to a frequency band centered at 16 MHz. As shown in FIG. 7D, multiplexer 208 maps at a time $t_4$ baseband radar pulse input signal 214 to a frequency band centered at 43 MHz. As shown in FIG. 7E, multiplexer 208 maps at a time $t_5$ baseband radar pulse input signal 214 to a frequency band centered at 81 MHz.

As shown in FIGS. 7A-E, radar pulse generator 200 is able to generate desired radar pulse signal 218 at various center frequencies merely by changing multiplexer control input signal 216. In this example embodiment, desired radar pulse signal 218 exhibits greater than 50 dB out-of-band suppression while utilizing only 40 weighting coefficients per polyphase path.

In summary, radars are used in both military and commercial applications to determine if there are objects within range of the radar and also determine the size, location, velocity, and other physical characteristics of those objects. Radars generate a pulse and transmit that pulse on a carrier frequency in the radar's designated frequency band. The carrier frequency may be varied in time, or hopped, to provide better performance or be more resistant to jamming. Prior art methods of generating multicarrier or frequency-hopped radar pulses are computationally expensive and slow to change carrier frequency, while other methods exhibit poor out-of-band performance and are difficult to calibrate.

Described herein are a system and method of generating radar pulses that are computationally efficient, create a clean power-efficient spectrum, and are dynamically tunable.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A radar pulse generator comprising:
    a multiplexer having a baseband radar pulse input, a multiplexer control input, a first channel output and a second channel output, said baseband radar pulse input being operable to receive a baseband radar pulse input signal, said multiplexer control input being operable to receive a multiplexer control input signal, said first channel output being operable to output a first channel output signal, said second channel output being operable to output a second channel output signal, the baseband radar pulse input signal being single channel baseband radar pulse signal, the multiplexer control input signal being operable to select one of the group consisting of the first channel output and the second channel output;
    a polyphase synthesizer operable to synthesize the first channel output signal, to synthesize the second channel output signal and to output a desired radar pulse signal based on the synthesized first channel output signal and the synthesized second channel output signal;

a first signal channel operable to provide the first channel output signal from said first channel output to said polyphase synthesizer;
a second signal channel operable to provide the second channel output signal from said second channel output to said polyphase synthesizer;
wherein said multiplexer control input is further operable to receive a second multiplexer control input signal, said first channel output is further operable to output a subsequent first channel output signal, said second channel output is further operable to output a subsequent second channel output signal, the second multiplexer control input signal being operable to select one of the group consisting of the first channel output and the second channel output;
wherein said polyphase synthesizer is further operable to synthesize the subsequent first channel output signal, to synthesize the subsequent second channel output signal and to output a subsequent desired radar pulse signal based on the synthesized subsequent first channel output signal and the synthesized subsequent second channel output signal;
wherein the desired radar pulse signal is different from the subsequent desired radar pulse signal;
wherein said polyphase synthesizer comprises:
 a fast Fourier transform component operable to receive the first channel output signal, to receive the second channel output signal, to perform a fast Fourier transform on the first channel output signal, to perform a fast Fourier transform signal on the second channel output signal, to output a first transformed signal based on the first channel output signal and to output a second transformed signal based on the second channel output signal;
 a first polyphase filter having a first weighting coefficient, said first polyphase filter being operable to generate a first polyphase filter signal based on the first transformed signal and the first weighting coefficient;
 a second polyphase filter having a second weighting coefficient, said second polyphase filter being operable to generate a second polyphase filter signal based on the second transformed signal and the second weighting coefficient;
 an interleaving component operable to output the desired radar pulse signal by interleaving the first polyphase filter signal and the second polyphase filter signal;
wherein said fast Fourier transform component is further operable to receive the subsequent first channel output signal, to receive the subsequent second channel output signal, to perform a fast Fourier transform on the subsequent first channel output signal, to perform a fast Fourier transform on the subsequent second channel output signal, to output a subsequent first transformed signal based on the subsequent first channel output signal and to output a subsequent second transformed signal based on the subsequent second channel output signal;
wherein said first polyphase filter is further operable to generate a subsequent first polyphase filter signal based on the subsequent first transformed signal and the first weighting coefficient;
wherein said second polyphase filter is further operable to generate a subsequent second polyphase filter signal based on the subsequent second transformed signal and the second weighting coefficient; and
wherein said interleaving component is further operable to output the subsequent desired radar pulse signal by interleaving the subsequent first polyphase filter signal and the subsequent second polyphase filter signal.

2. The radar pulse generator of claim 1, wherein said multiplexer is operable to output the first channel output signal having a frequency resolution of 1 MHz.

3. A radar pulse generator comprising:
a multiplexer having a baseband radar pulse input, a multiplexer control input, a first channel output and a second channel output, said baseband radar pulse input being operable to receive a baseband radar pulse input signal, said multiplexer control input being operable to receive a multiplexer control input signal, said first channel output being operable to output a first channel output signal, said second channel output being operable to output a second channel output signal, the baseband radar pulse input signal being single channel baseband radar pulse signal, the multiplexer control input signal being operable to select one of the group consisting of the first channel output and the second channel output;
a polyphase synthesizer operable to synthesize the first channel output signal, to synthesize the second channel output signal and to output a desired radar pulse signal based on the synthesized first channel output signal and the synthesized second channel output signal;
a first signal channel operable to provide the first channel output signal from said first channel output to said polyphase synthesizer;
a second signal channel operable to provide the second channel output signal from said second channel output to said polyphase synthesizer;
wherein said polyphase synthesizer comprises:
 a fast Fourier transform component operable to receive the first channel output signal, to receive the second channel output signal, to perform a fast Fourier transform on the first channel output signal, to perform a fast Fourier transform signal on the second channel output signal, to output a first transformed signal based on the first channel output signal and to output a second transformed signal based on the second channel output signal;
 a first polyphase filter having a first weighting coefficient, said first polyphase filter being operable to generate a first polyphase filter signal based on the first transformed signal and the first weighting coefficient;
 a second polyphase filter having a second weighting coefficient, said second polyphase filter being operable to generate a second polyphase filter signal based on the second transformed signal and the second weighting coefficient; and
 an interleaving component operable to output the desired radar pulse signal by interleaving the first polyphase filter signal and the second polyphase filter signal.

4. A method of generating a radar pulse signal, said method comprising:
receiving, at a multiplexer having a baseband radar pulse input, a multiplexer control input, a first channel output and a second channel output, a baseband radar pulse input signal at the baseband radar pulse input, the baseband radar pulse input signal being a single channel baseband radar pulse signal;

receiving, at the multiplexer control input, a multiplexer control input signal that is operable to select one of the group consisting of the first channel output and the second channel output;

outputting, one of the group consisting of a first channel output signal on the first channel output and a second channel output signal on the second channel output, based on the multiplexer control input signal;

providing, via a first signal channel, the first channel output signal from the first channel output to a polyphase synthesizer;

providing, via a second signal channel, the second channel output signal from the second channel output to the polyphase synthesizer;

synthesizing, via the polyphase synthesizer, the first channel output signal;

synthesizing, via the polyphase synthesizer, the second channel output signal;

outputting, via the polyphase synthesizer, a desired radar pulse signal based on the synthesized first channel output signal and the synthesized second channel output signal;

receiving, at the multiplexer control input, a second multiplexer control input signal that is operable to select one of the group consisting of the first channel output and the second channel output outputting, via the first channel output, a subsequent first channel output signal;

outputting, via the second channel output, a subsequent second channel output signal;

synthesizing, via the polyphase synthesizer, the subsequent first channel output signal;

synthesizing, via the polyphase synthesizer, the subsequent second channel output signal;

outputting, via the polyphase synthesizer, a subsequent desired radar pulse signal based on the synthesized subsequent first channel output signal and the synthesized subsequent second channel output signal, wherein the desired radar pulse signal is different from the subsequent desired radar pulse signal;

wherein said providing, via a first signal channel, the first channel output signal from the first channel output to a polyphase synthesizer comprises providing the first channel output signal from the first channel output to a polyphase synthesizer comprising:

a fast Fourier transform component operable to receive the first channel output signal, to receive the second channel output signal, to perform a fast Fourier transform on the first channel output signal, to perform a fast Fourier transform signal on the second channel output signal, to output a first transformed signal based on the first channel output signal and to output a second transformed signal based on the second channel output signal;

a first polyphase filter having a first weighting coefficient, the first polyphase filter being operable to generate a first polyphase filter signal based on the first transformed signal and the first weighting coefficient;

a second polyphase filter having a second weighting coefficient, the second polyphase filter being operable to generate a second polyphase filter signal based on the second transformed signal and the second weighting coefficient; and an interleaving component operable to output the desired radar pulse signal by interleaving the first polyphase filter signal and the second polyphase filter signal.

5. The method of claim 4, further comprising:

receiving, via wherein the fast Fourier transform component, the subsequent first channel output signal;

receiving, via the fast Fourier transform component, the subsequent second channel output signal;

performing, via the fast Fourier transform component, a fast Fourier transform on the subsequent first channel output signal;

performing, via the fast Fourier transform component, a fast Fourier transform on the subsequent second channel output signal;

outputting, via the fast Fourier transform component, a subsequent first transformed signal based on the subsequent first channel output signal;

outputting, via the fast Fourier transform component, output a subsequent second transformed signal based on the subsequent second channel output signal;

generating, via the first polyphase filter, generate a subsequent first polyphase filter signal based on the subsequent first transformed signal and the first weighting coefficient;

generating, via the second polyphase filter, a subsequent second polyphase filter signal based on the subsequent second transformed signal and the second weighting coefficient; and outputting, via the interleaving component, the subsequent desired radar pulse signal by interleaving the subsequent first polyphase filter signal and the subsequent second polyphase filter signal.

6. The method of claim 5, wherein said outputting, one of the group consisting of a first channel output signal on the first channel output and a second channel output signal on the second channel output, based on the multiplexer control input signal comprises outputting the first channel output signal having a frequency resolution of 1 MHz.

7. A non-transitory, tangible, computer-readable media having computer-readable instructions stored thereon, the computer-readable instructions being capable of being read by a computer and being capable of instructing the computer to perform a method of generating a radar pulse signal comprising:

receiving, at a multiplexer having a baseband radar pulse input, a multiplexer control input, a first channel output and a second channel output, a baseband radar pulse input signal at the baseband radar pulse input, the baseband radar pulse input signal being a single channel baseband radar pulse signal;

receiving, at the multiplexer control input, a multiplexer control input signal that is operable to select one of the group consisting of the first channel output and the second channel output;

outputting, one of the group consisting of a first channel output signal on the first channel output and a second channel output signal on the second channel output, based on the multiplexer control input signal;

providing, via a first signal channel, the first channel output signal from the first channel output to a polyphase synthesizer;

providing, via a second signal channel, the second channel output signal from the second channel output to the polyphase synthesizer;

synthesizing, via the polyphase synthesizer, the first channel output signal;

synthesizing, via the polyphase synthesizer, the second channel output signal;

outputting, via the polyphase synthesizer, a desired radar pulse signal based on the synthesized first channel output signal and the synthesized second channel output signal;
wherein the computer-readable instructions are capable of instructing the computer to perform the method, further comprising:
receiving, at the multiplexer control input, a second multiplexer control input signal that is operable to select one of the group consisting of the first channel output and the second channel output;
outputting, via the first channel output, a subsequent first channel output signal;
outputting, via the second channel output, a subsequent second channel output signal;
synthesizing, via the polyphase synthesizer, the subsequent first channel output signal;
synthesizing, via the polyphase synthesizer, the subsequent second channel output signal;
outputting, via the polyphase synthesizer, a subsequent desired radar pulse signal based on the synthesized subsequent first channel output signal and the synthesized subsequent second channel output signal;
wherein the desired radar pulse signal is different from the subsequent desired radar pulse signal;
wherein the computer-readable instructions are capable of instructing the computer to perform the method wherein said providing, via a first signal channel, the first channel output signal from the first channel output to a polyphase synthesizer comprises providing the first channel output signal from the first channel output to a polyphase synthesizer comprising:
a fast Fourier transform component operable to receive the first channel output signal, to receive the second channel output signal, to perform a fast Fourier transform on the first channel output signal, to perform a fast Fourier transform signal on the second channel output signal, to output a first transformed signal based on the first channel output signal and to output a second transformed signal based on the second channel output signal;
a first polyphase filter having a first weighting coefficient, the first polyphase filter being operable to generate a first polyphase filter signal based on the first transformed signal and the first weighting coefficient;
a second polyphase filter having a second weighting coefficient, the second polyphase filter being operable to generate a second polyphase filter signal based on the second transformed signal and the second weighting coefficient;
an interleaving component operable to output the desired radar pulse signal by interleaving the first polyphase filter signal and the second polyphase filter signal;
wherein the computer-readable instructions are capable of instructing the computer to perform the method, further comprising:
receiving, via wherein the fast Fourier transform component, the subsequent first channel output signal;
receiving, via the fast Fourier transform component, the subsequent second channel output signal;
performing, via the fast Fourier transform component, a fast Fourier transform on the subsequent first channel output signal;
performing, via the fast Fourier transform component, a fast Fourier transform on the subsequent second channel output signal;
outputting, via the fast Fourier transform component, a subsequent first transformed signal based on the subsequent first channel output signal;
outputting, via the fast Fourier transform component, output a subsequent second transformed signal based on the subsequent second channel output signal;
generating, via the first polyphase filter, generate a subsequent first polyphase filter signal based on the subsequent first transformed signal and the first weighting coefficient;
generating, via the second polyphase filter, a subsequent second polyphase filter signal based on the subsequent second transformed signal and the second weighting coefficient; and
outputting, via the interleaving component, the subsequent desired radar pulse signal by interleaving the subsequent first polyphase filter signal and the subsequent second polyphase filter signal.

8. The non-transitory, tangible, computer-readable media of claim 7, wherein the computer-readable instructions are capable of instructing the computer to perform the method wherein said outputting, one of the group consisting of a first channel output signal on the first channel output and a second channel output signal on the second channel output, based on the multiplexer control input signal comprises outputting the first channel output signal having a frequency resolution of 1 MHz.

\* \* \* \* \*